United States Patent [19]

Baba

[11] Patent Number: 4,963,988
[45] Date of Patent: Oct. 16, 1990

[54] FACSIMILE DEVICE
[75] Inventor: Keizo Baba, Atsugi, Japan
[73] Assignee: Ricoh Company, Ltd., Tokyo, Japan
[21] Appl. No.: 313,452
[22] Filed: Feb. 22, 1989
[30] Foreign Application Priority Data
Feb. 22, 1988 [JP] Japan .................................. 63-040260
[51] Int. Cl.⁵ ....................... H04N 1/00; G01D 15/28
[52] U.S. Cl. ..................................... 358/296; 346/136
[58] Field of Search ........................... 358/296, 304; 346/76 PH, 134, 136; 400/120

[56] References Cited
FOREIGN PATENT DOCUMENTS

| | | | |
|---|---|---|---|
| 010957 | 1/1983 | Japan | 358/296 |
| 046165 | 3/1985 | Japan | 358/296 |
| 229467 | 11/1985 | Japan | 358/304 |

*Primary Examiner*—Bruce A. Reynolds
*Assistant Examiner*—Scott A. Rogers
*Attorney, Agent, or Firm*—Oblon, Spivak, McClelland, Maier & Neustadt

[57] ABSTRACT

A facsimile device in which plural sets of recording medium can be provided. While images are recorded on one set of recording medium, the first set is changed over to another set of recording medium by a change-over signal transmitted from a control section of the facsimile device, after finishing recording the images being received on the first set. Thereafter, the images can be recorded on the other set. An image memory is provided for storing image data transmitted during the time period for changing over the recording medium. The image data received are accumulated in the image memory during the change-over and when finished, the accumulated image data are read out in order from the image memory and recorded on the other set of recording medium.

19 Claims, 7 Drawing Sheets

FACSIMILE DEVICE

BACKGROUND OF THE INVENTION

1. Field of the Invention:

The present invention relates to a facsimile device, in particular, a facsimile device in which two or more sets of recording paper can be set and one set of recording paper can be changed over to the other one as occasion demands for printing image thereon.

2. Description of the Prior Art:

With respect to the facsimile device, there are some special types of facsimile device such as a type of facsimile device capable of recording images on a recording paper of a size corresponding to that of the received image's data, or another type of facsimile device capable of setting two or more sets of recording paper therein in order to take a countermeasure against becoming out of stock, etc.

In such facsimile device capable of setting two or more sets of recording paper, when the size of the image data is changed or the recording paper gets out of stock during the time period of receiving image data, a set of recording paper being employed is changed over to another set of recording paper. However, it takes a constant long time to change over a set of paper to the other one. When the image data are received in accordance with an ordinary procedure of facsimile correspondence, the image data of next page are transmitted to the facsimile device before finishing to change over the set of recording paper. Therefore, it needs to consume the time for waiting.

Hereupon, in the conventional facsimile device, the time for waiting is consumed by performing a protocol manipulation (preliminary procedure before receiving information such as settings of paper size, transmission speed, reduction or enlargement, coding method, i.e. data compression, etc.) at the receiving side of the facsimile device, and thereby the transmission of the next page's image data is delayed until changing over the set of recording paper is finished completely. Therefore, the image data can be printed out on the appropriate recording paper without causing any deficit (loss) of information.

However, in such conventional facsimile device, since a timing of receiving the image data is delayed by performing a protocol manipulation and the recording paper is changed over to the other one, the communication time may be prolonged thereby and the communication fee may be raised inevitably in accordance with the prolonged communication time. The above-mentioned matters were the problems to be solved in the past.

SUMMARY OF THE INVENTION

It is a primary object of the present invention to provide a facsimile device having an image memory, in which image data transmitted from outside during the time period of changing over the recording paper to the other are stored in an image memory, and when the change-over of the recording paper is finished image data are read out in order from the image memory and the same are printed out on the recording paper.

It is another object of the present invention to enable the image data to be received instantly without delaying the timing of receiving the image data by performing a protocol manipulation.

It is still another object of the present invention to shorten the communication time and thereby to reduce the communication fee.

DESCRIPTION OF THE PREFERRED EMBODIMENT

Figure 7:
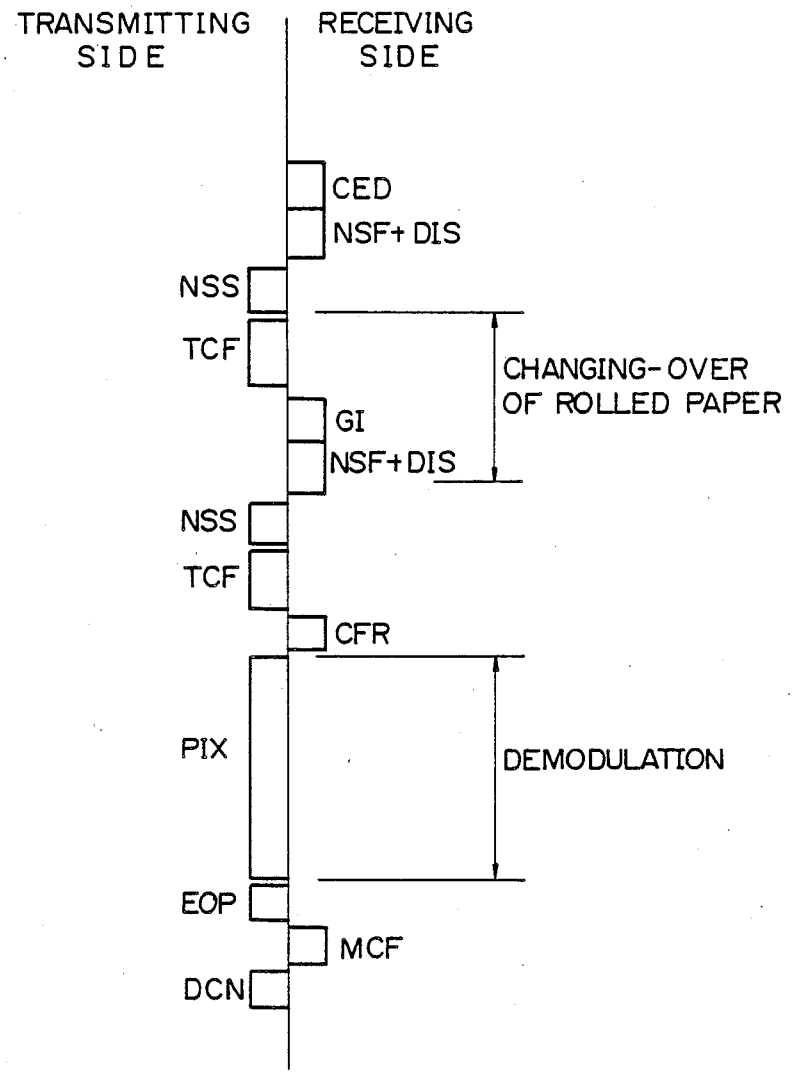
FIG. 7 is a timing chart of control signal functioning at the time of receiving various signals in the prior art facsimile device.

In the conventional facsimile device, the time for waiting is consumed by performing a protocol manipulation at the receiving side of the facsimile device, and thereby the transmission of the next page's image data is delayed changing over the set of recording paper is finished completely. Namely, as shown in FIG. 7, when the receiving-side facsimile device responds to the dialing (calling-out) from the transmitting-side facsimile device and sends out thereto a CED signal (Called Station Identification Signal), an NSF signal (Non Standard Function Identification Signal or Non Standard Facilities Signal), and a DIS Signal (Digital Identification Signal), the transmitting-side facsimile device sends out an NSS signal (Non Standard Facilities Set Up Signal) and a TCF signal (Training Check Signal). When the receiving-side facsimile device receives the NSS signal, it judges a necessity of changing over the set of recording paper to the other one. At this time, the receiving-side facsimile device does not send out a CFR signal (Confirmation To Receive Signal) that is a response signal responding to the NSS signal. Instead, the same sends out a GI signal (Group Identification Signal), and further it sends out once again the NSF signal and the DIS signal.

When the transmitting-side facsimile device transmits once again the NSS signal and the TCF signal and change-over of the recording paper is already finished, the receiving-side facsimile device sends out the CFR signal at this point of time and starts to receive the image data. Consequently, the image data can be printed out on the appropriate recording paper without causing any deficit (loss) of information.

However, in such conventional facsimile device, since a timing of receiving the image data is delayed by performing a protocol manipulation and the recording paper is changed over to the other one, the communication time may be prolonged thereby and the communication fee may be raised inevitably in accordance with the prolonged communication time. The above-mentioned matters were the problems to be solved in the past.

In order to attain the afore-mentioned objects, the present invention realized a facsimile device in which two or more sets of recording paper can be set to the facsimile device, during a time period of recording images being received on one of the sets of recording paper the set of recording paper is changed over to the other set of recording paper by a change-over signal transmitted from a control part of the facsimile device after finishing to record the images being received on the page of the one set of recording paper and thereafter the images can be recorded on the other set of recording paper, characterized in that the facsimile device further comprises an image memory for storing image data transmitted during at least a time period needed for changing over the set of recording paper to the other, the image data received are accumulated in the image memory at the time of changing over the set of recording paper to the other, and when change-over of the sets of recording paper is completely finished, the accumulated image data are read out in order from the image memory and thereafter the read-out image data are recorded on the changed-over set of recording paper.

The construction of the present invention is explained hereinafter concretely, on the basis of the embodiment according to the present invention. FIGS. 1 to 6 are figures showing an embodiment of the present invention.

Figure 1:
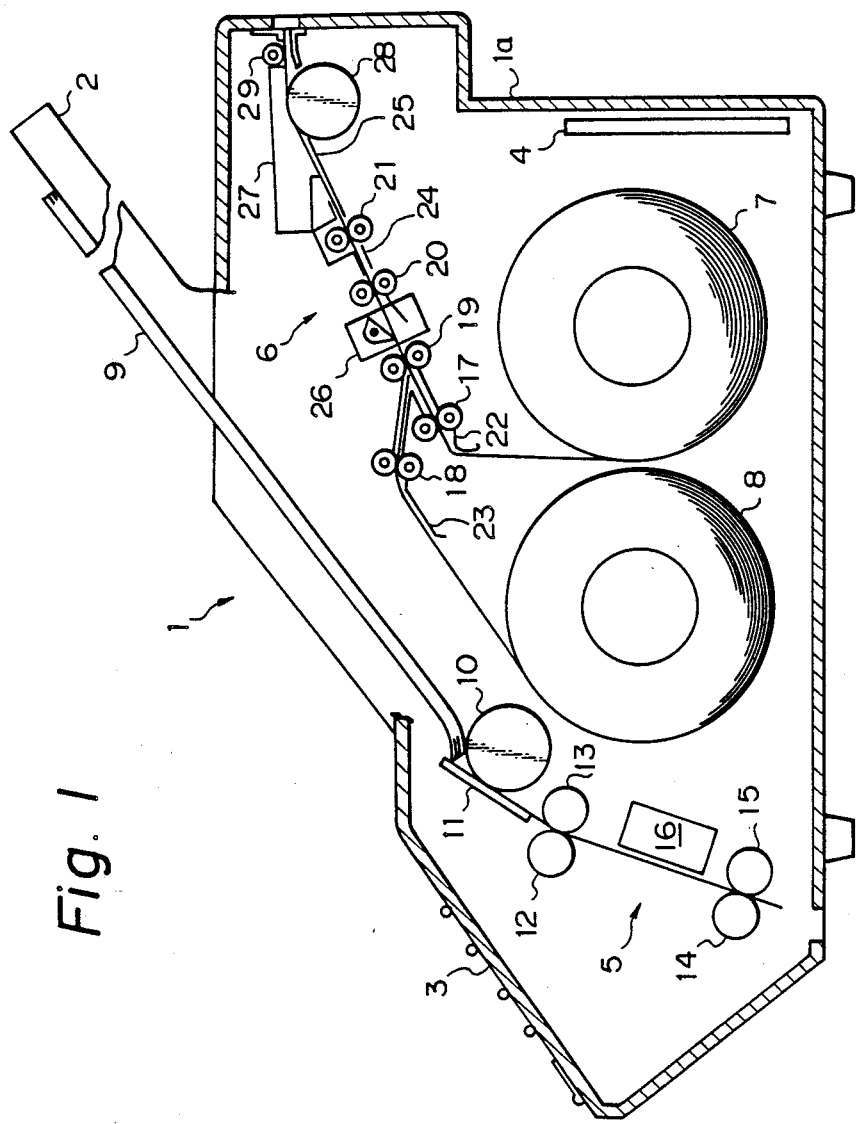
FIG. 1 is a side cross-sectional view of the facsimile device according to the present invention.

In FIG. 1, the reference numeral 1 represents a facsimile device. The main body 1a of the facsimile device 1 comprises an original manuscript table 2, a manipulating section 3, a control section 4, a scanner unit 5, a plotter unit 6 and a couple of rolled-state heat-sensitive recording papers 7 and 8.

An original manuscript table 2 is employed as a stand for setting up thereon an original manuscript 9. A plurality of original manuscripts can be gathered and set up on the table. The manipulating section 3 is provided with, for instance, start key, ten key, copying key, various sorts of control switches and displaying portion, etc. An operator inputs a command for controlling respective parts of the facsimile device. The control section 4, as mentioned later, collectively controls the operation of the facsimile device 1. The scanner unit 5 comprises an ADF (Automatic Document Feed) roller 10, a separation rubber 11, a pressure roller 12, a feed roller 13, another pressure roller 14, another feed roller 15, and a reading-out section 16. The ADF roller 10 is the one for feeding paper (document) automatically, and the same is rotated by the motive power of the drive source not shown in FIG. 1. The original manuscript 9 set up on the table 2 is sent out to the gap between the pressure roller 12 and feed roller 13 one by one by the cooperative action of the ADF roller 10 and the separation rubber 11. The pressure roller 12, the feed roller 13, the pressure roller 14 and the feed roller 15 respectively rotate at a same revolutionary speed, and all of them contribute to convey the original manuscript 9 sent out from the ADF roller 10 at a predetermined speed. In the reading-out section 16, for instance, a close-contact type line image sensor is employed, and the image information recorded on the original manuscript 9 carried by the afore-mentioned rollers 12 through 15 at the predetermined speed is read out line by line by the image sensor 16 starting from the head line. The image sensor 16 performs photo-electric conversion during the time of reading out the image information and outputs the converted signal to the control section 4 as image data.

When the performance of reading out the image information of the original manuscript 9 comes to an end, the original manuscript 9 is discharged by the pressure roller 14 and the feed roller 15 into the paper discharging tray not shown in FIG. 1. Here, a paper guide of the scanner unit 5 is omitted in FIG. 1.

On the other hand, the plotter unit 6 is provided with transporting rollers 17, 18, 19 and 20, a resist roller 21, paper guides 22, 23, 24 and 25, a cutter unit 26, a thermal head 27, a platen roller 28 and a discharging roller 29. And then, heat-sensitive paper 7 or another heat-sensitive paper 8 is alternatively supplied to the plotter unit 6.

In the afore-mentioned thermal head 27, a plurality of heat-emitting elements are disposed so as to arrange the heat-emitting elements of the head 27 in a direction of the axis of the platen roller 28 at a place opposing to the platen roller 28.

Those heat-emitting elements emit heat energy in response to heat pulses supplied thereto on the basis of the image information and the same heat the heat-sensitive recording paper 7 or the other heat-sensitive paper 8 so as to obtain a visible image thereon. Driving of the transporting rollers 17 through 20 and the resist roller 21 is controlled by the control section 4, and whether the recording paper 7 or 8 is supplied to the plotter unit 6 is determined in accordance with whether the transporting roller 17 or 18 functions. The cutter unit 26 is controlled by the control section 4, and thereby the same cuts the heat-sensitive paper 7 or 8 so as to get a predetermined size when recording thereon is finished.

Changing-over of the heat-sensitive recording paper 7 or 8 to the other is done by winding back the transporting rollers 17 and 19 or the transporting rollers 18 and 19 in a rotating direction opposite to that of transporting those rollers and taking out the recording paper 7 or 8 being employed.

Thereafter, the heat-sensitive recording paper 7 or 8 to be newly employed is set by driving the transporting rollers 17 and 19 or the transporting rollers 18 and 19.

Figure 2:
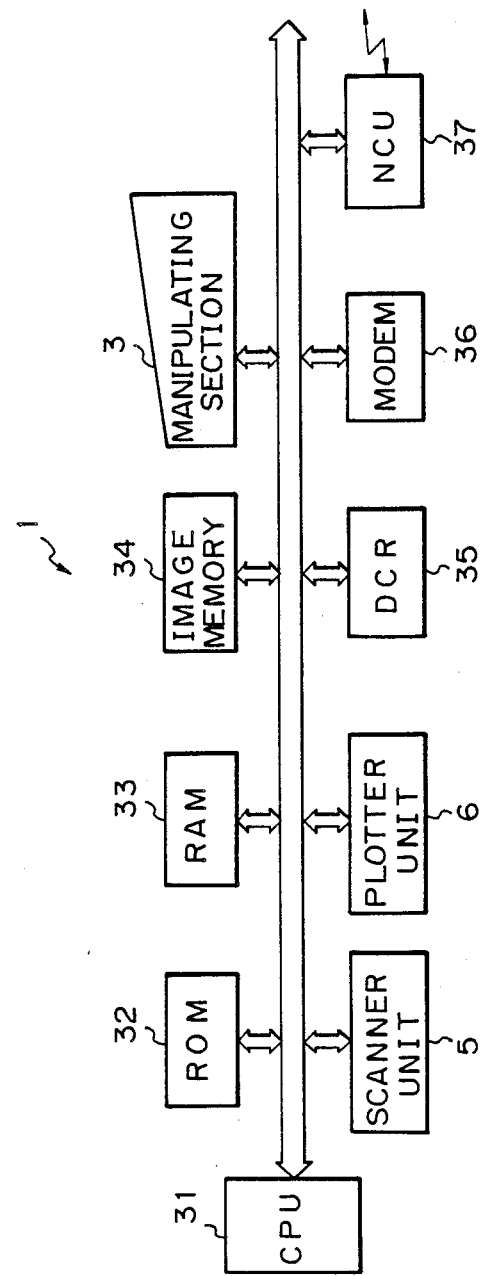
FIG. 2 is a circuit block diagram of the facsimile device.

As shown in FIG. 2, the control section 4 comprises a CPU (Central Processing Unit) 31, a ROM (Read Only Memory) 32, a RAM (Random Access Memory) 33, an image memory 34, a DCR (Data Compression And Reproduction or Reconstruction Unit) 35, a MODEM (Modulation/Demodulation Unit) 36 and an NCU (Network Control Unit) 37.

A control program of the entire system is written (stored) in the ROM 32, and further a treatment program for changing over the recording paper according to the present invention is also written (stored) therein. A working area is formed in the RAM 33. The CPU 31 controls the respective parts of the facsimile device 1 such that the external data are introduced into the RAM 33 in accordance with the program written (stored) in the ROM 32 and the data are transmitted or received between the CPU 31 and the RAM 33, and thereby the CPU 31 executes a sequence as the facsimile device 1 and further practices the program of the present invention.

The image memory 34 is a so-called FIFO Memory of First-In-First-Out type, and the same has a capacitance capable of memorizing the image data transmitted during at least the time period of changing over the recording paper 7 to the other recording paper 8 or vice versa. At the time of changing over the heat-sensitive recording papers 7 and 8, the image memory 34 accumulates the image data sent out from the transmission side.

At the time of transmitting information, the facsimile device 1 scans the original manuscript 9 set up on the original manuscript table 2 from the head page and reads out the image information by means of the scanner unit 5. The image data produced by the scanner unit 5 are sent out to the DCR (Data Compression And Reproduction Unit) 35. The amount of the image data sent out to the unit 35 is reduced (data compression is done) therein without losing any original information. After the image data is sent to a MODEM 36 in order and modulated therein, the image data are sent out to the circuit through a network control unit 37.

On the other hand, in case that changing-over of the recording papers 7 and 8 is not perfomed at the time of receiving information, the modulated signal (image data) transmitted through the circuit is further introduced to the MODEM 36 through the network control unit 37, and the signal (image data) is sent to the data compression/reproduction unit 35 after being demodulated in the MODEM 36. The image data reproduced to the original information in the data compression/reproduction unit 35 are sent to the plotter unit 6, and the image data are recorded therein on the recording paper 7 or the recording paper 8.

On the contrary, in case that changing-over of the recording papers 7 and 8 is performed at the time of receiving information, the image data transmitted through the circuit are stored through the network control section 37 in the image memory 34 during the time period of changing over the recording papers 7 and 8. When changing-over of the recording papers 7 and 8 terminates, the image data stored in the image memory 34 are read out in the order of inputting, from the instant of its termination, and the data read out are sent to the MODEM 36. After demodulating the data in the MODEM 36, the data are reproduced in the data compression/reproduction unit 35. And thereafter, the reproduced data are recorded by use of the plotter unit 6 on the heat-sensitive recording paper 7 or 8 which has been already changed over.

Figure 4:
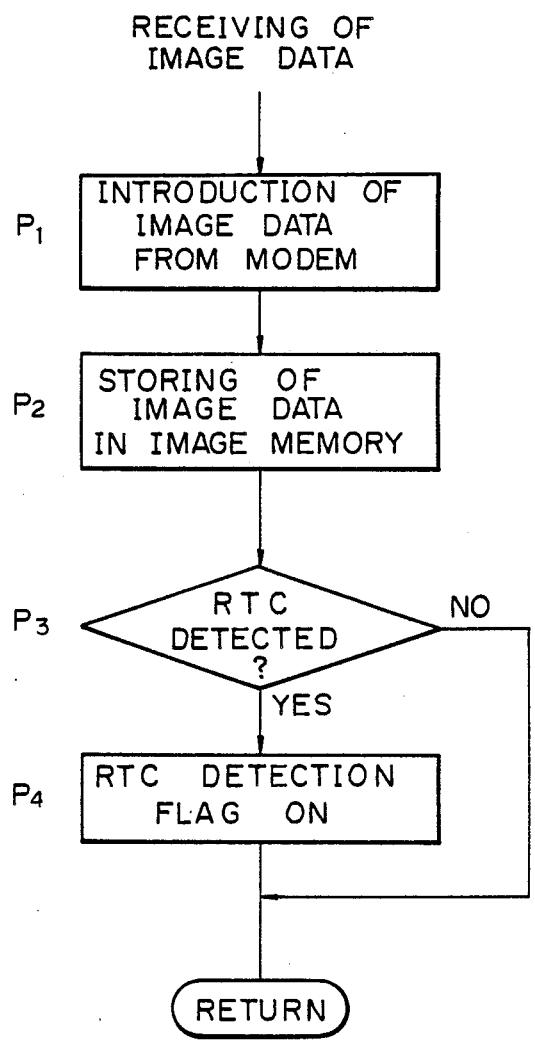
FIG. 4 is a flow chart showing image data signal receiving treatment performed by the facsimile device.
Figure 5:
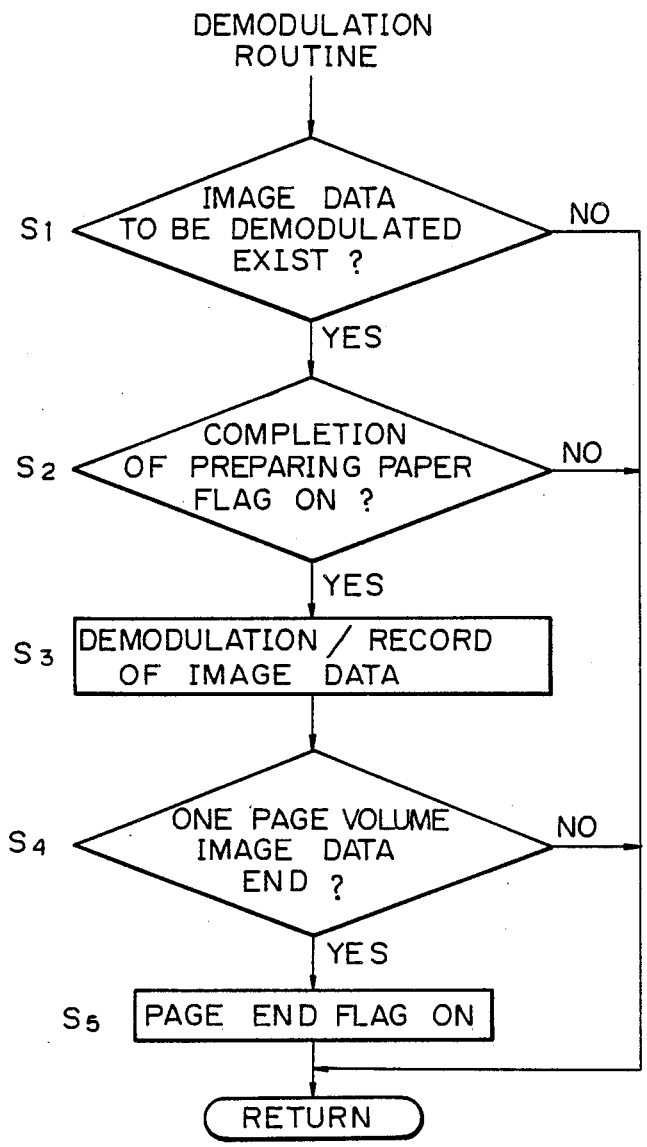
FIG. 5 is a flow chart showing demodulation (recovering) routine performed by the facsimile device.

Next, the operational function of the facsimile device of the present invention is described hereinafter. The present invention is characterized by the treatment performed in the case of changing over the heat-sensitive recording papers 7 and 8 at the time of receiving information. The changing-over treatment of the recording paper is described with reference to the flow charts as shown in FIGS. 3 through 5 and the timing chart of the control signal as shown in FIG. 6.

Figure 3:
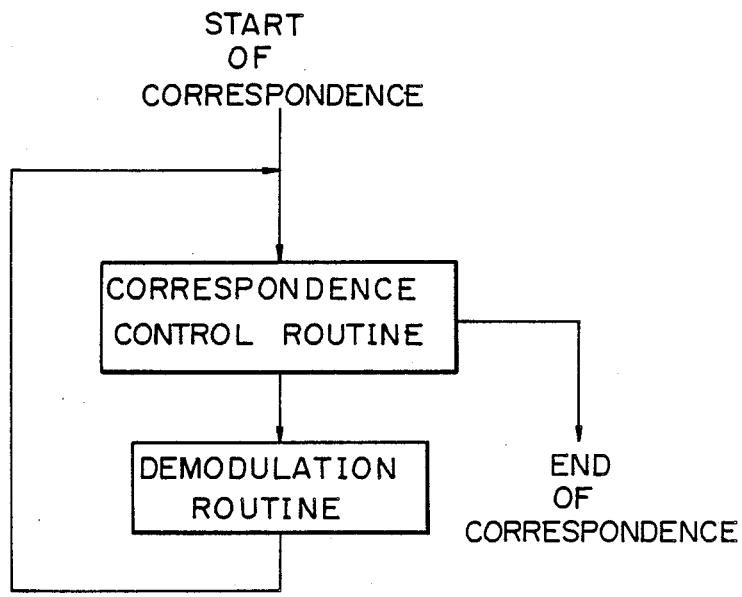
FIG. 3 is a main flow chart showing signal receiving treatment performed by the facsimile device.

In the present invention, since the control of the facsimile controlling signal and the demodulation of the image data need to be done simultaneously at the time of receiving information, a program provided with a correspondence control routine and a demodulation routine is accommodated in the ROM 32 of the control section 4, as shown in FIG. 3.

In the correspondence control routine, the facsimile device according to the present invention performs the ordinary controls of the facsimile control signal such as judgement of various commands, changing-over of the MODEM control, etc., and further performs demodulation start triggering to the demodulation routine, outputting of the changing-over command for the heat-sensitive recording papers 7 and 8, and so on. On the other hand, in the demodulation routine, the received image data are demodulated, reproduced and recorded.

Figure 6:
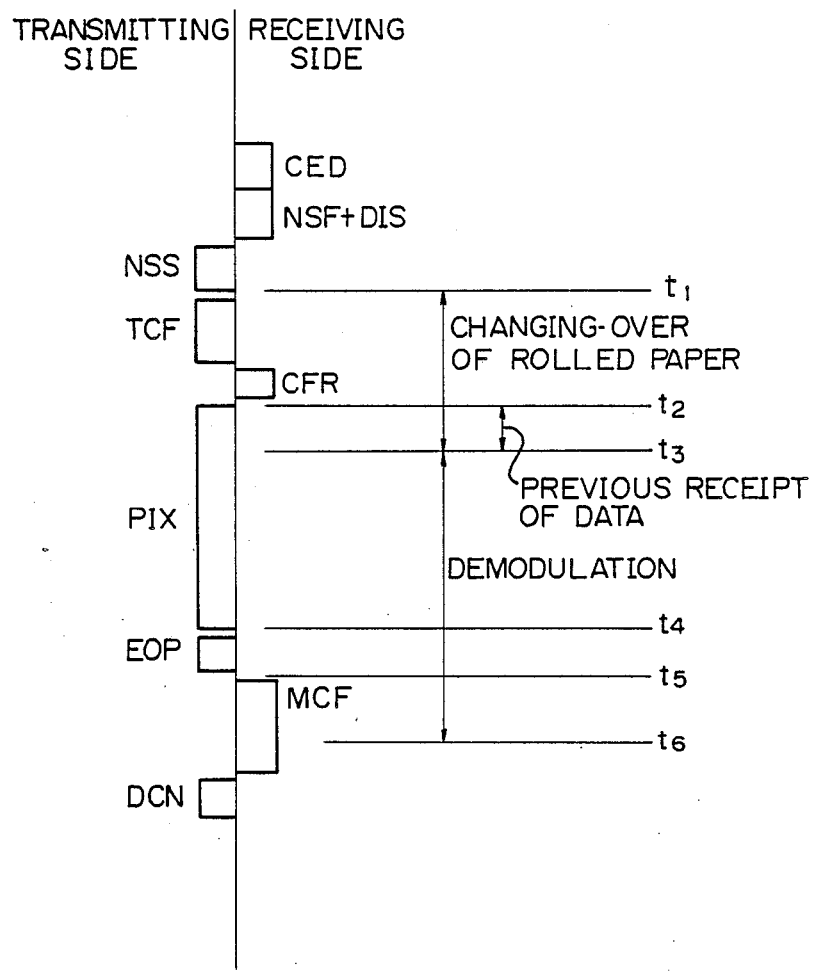
FIG. 6 is a timing chart of control signal functioning at the time of receiving various signals in the facsimile device according to the present invention.

Namely, as shown in FIG. 6, the facsimile device 1 sends out CED Signal (Called Station Identification Signal), NSF Signal (Non Standard Facilities Signal) and DIS Signal (Digital Identification Signal) in order to respond to the calling-out or dialing from the mate facsimile device, and the signal transmitting side of the facsimile device sends out NSS Signal (Non Standard Facilities Set Up Signal) and TCF Signal (Training Check Signal). When the signal receiving side facsimile device 1 receives the NSS Signal, it judges whether changing-over of the heat-sensitive recording papers 7 and 8 is necessary or not in accordance with the contents of the NSS Signal and the signal of the recording paper sensor not shown in FIG. 6 and others. In the case of judging that the changing-over of the heat-sensitive recording papers 7 and 8 is necessary, the MODEM 36 is set in a state of being capable of receiving the TCF Signal. (Refer to the time point t1 in FIG. 6.) When the facsimile device 1 receives the TCF Signal, it sends out the CFR Signal (Confirmation To Receive Signal) immediately. And further, when the facsimile device 1 receives the image data, that is, PIX Signal (Pixel or Picture Element Signal), from the mate facsimile device, it applies a signal receiving start trigger to the image data receiving flow. (Refer to the time point t2 in FIG. 6.)

The flow of receiving the image data operates depending on an interruption request transmitted from the MODEM 36, and receives the image data in accordance with a procedure as shown in FIG. 4. Namely, when the image data are transferred from the network control unit 37, the transferred data are introduced into the MODEM 36 (Step P1), and the image data introduced into the MODEM 36 are stored in order in the image memory (Step P2).

When receiving of the image data consisting of one page volume data terminates and an RTC Signal (Return To Control Signal) showing a transfer to the control signal is detected by the CPU 31 (Step P3), an RTC detection flag is set up and thereby the main flow terminates (Step P4).

On the other hand, as soon as the image data are received, whether the changing-over of the heat-sensitive papers 7 and 8 has been already finished or not is checked. When the changing-over of the heat-sensitive recording papers 7 and 8 comes to an end, a flag showing completion of preparing the recording paper is set up and start of demodulation is triggered. (Refer to the time-point t3 in FIG. 6.) Namely, in the routine of demodulation, whether the image data to be demodulated exist or not is checked as shown in FIG. 5 (STEP S1). If the image data exist, whether the flag showing completion of preparing the recording paper is set up or not is checked (Step S2). When the flag showing completion of preparing paper is set up, the image data are demodulated in the MODEM 36. The demodulated image data are reproduced in the data compression and reproduction unit 35, and thereafter, the image data are recorded by use of the plotter unit 6 on the heat sensitive recording paper 7 or 8 (STEP S3). Namely, the image data stored in the image memory 34 are read out in the order of storing and demodulated in the MODEM 36. Thereafter, the image data are reproduced in the data compression and reproduction unit 35. The image data reproduced in the data compression and reproduction unit 35 are transferred to the plotter unit 6, and the same are recorded on the heat-sensitive recording paper 7 or 8 which has been already changed over.

At the time of demodulating and recording, the above-mentioned image data are simultaneously received, and stored in the image memory 34. And further, when the treatment of the image data containing one page volume information comes to an end (Step S4), a page end flag is set up and thereby the main flow terminates (Step S5).

As shown in FIG. 6, since receiving of the image data comes to an end during the time period of demodulating treatment, when the RTC (Return To Control) detection flag is set up (the aforementioned Step P4 shown in FIG. 4), the MODEM 36 is changed over to the lower speed side and thereby receives an EOP Signal (End Of Procedure Signal)(the time point t4 in FIG. 6). When the EOP Signal is received, an MCF Signal (Message Confirmation Signal) is sent out therefrom (the time point t5 in FIG. 6). However, at this point of time, the demodulation thereof may be probably not yet finished, and a preamble (preliminary signal preceding to binary code information) is sent out [in the case of 300 bit/s MODEM, the flag of HDLC (High Level Data Link Control) of 1 sec+15% is succesively transmitted.], until the demodulation terminates and the page end flag is set up. When the page end flag is set up, the MCF Signal is sent out (the time point t6 in FIG. 6), and at the time of receiving the MCF Signal the transmission side of the facsimile device sends out a DCN Signal (Disconnect Signal).

As mentioned heretofore, in case that the heat-sensitive recording papers 7 and 8 need to be changed over, receiving of the image data can be started immediately in a similar way to the ordinary way of correspondence, without delaying the timing of receiving the image data by manipulating the protocol until the changing-over of the heat-sensitive recording papers 7 and 8 comes to an end as is the case of the conventional facsimile device. Consequently, the time of correspondence can be shortened, and further the correspondence fee can be reduced.

Moreover, although the present invention describes only a case of receiving the image data of one page volume and changing over the recording paper is described in the afore-mentioned embodiment of the present invention, the case is not limited thereto. The present invention can be also applied to another case of receiving the image data of plural pages volume. And further, the present invention can be also applied in a similar way to the other case of changing over the recording paper at a moment of transition between a page and another (next) page.

As is apparent from the foregoing description, according to the present invention, even in the case of changing over the recording paper to the other new one during the time period of performing facsimile correspondence, the image data can be received immediately without delaying the timing of receiving the image data by manipulating the protocol, and therefore the time of correspondence can be shortened and the correspondence fee can be reduced as mentioned above.

What is claimed is:

1. A facsimile device with two or more sets of recording medium, comprising:
   control means for controlling said facsimile device so as to change over a first set of recording medium to a second set of recording medium when an abnormal state such as a shortage of recording medium is detected;
   memory means for storing therein image information during a time period of changing over said first set of recording medium to said second set of recording medium when said image information is communicated to the facsimile device from an other; and
   recording means for recording said image information on said first set of recording medium, temporarily suspending the operation of recording when an abnormal state such as a shortage of recording medium is detected, storing said image information in said memory means at the same time, reading out in order said image information from said memory means after finishing the change-over, and recording said image information on said second set of recording medium.

2. A facsimile device in which two or more sets of recording medium can be provided, so that during a time period of recording images being received on a first set of recording medium, said first set of recording medium is changed over to a second set of recording medium by a change-over signal transmitted from a control section of said facsimile device after finishing recording said images on said first set of recording medium and thereafter said images can be recorded on said second set of recording medium, wherein said facsimile device further comprises an image memory for storing image data transmitted during at least a time period needed for changing over said first set of recording medium to the second, said image data received being accumulated in said image memory during the time of changing over, and when change-over is completely finished said accumulated image data are read out in order from said image memory and thereafter said read-out image data are recorded on said second set of recording medium.

3. A facsimile device comprising:
   an original manuscript table employed as a stand for setting up thereon an original manuscript;
   a manipulating section for inputting control commands for said facsimile device;
   a scanner unit for scanning said original manuscript and reading out image formed thereon;
   two or more sets of rolled-state heat-sensitive recording medium;
   a plotter unit for recording said image on a first set of recording medium selected from said two or more sets of recording medium; and
   control means for controlling said facsimile device so as to stop recording and change over said first set of recording medium to a second set of recording medium when an abnormal state such as a shortage of recording medium is detected and thereafter start again recording on said second set of recording medium,
   wherein, during a time period of recording images on said first set, said first set of recording medium is changed over to said second set of recording medium by a change-over signal transmitted from said control means when said abnormal state of recording medium is detected after finishing recording said images being received on said first set of recording medium and thereafter said images are recorded on said second set of recording medium, and
   wherein an image memory included in said control means stores image data transmitted during at least a time period needed for changing over said first set of recording medium to said second set and when change-over is completely finished said stored image data are read out in order from said image memory and thereafter said read-out image data are recorded on said changed-over set of recording medium.

4. A facsimile device as defined in claim 3, in which said control means comprises:
- a read only memory for storing therein a control program of the facsimile device and further storing therein a change-over processing program for processing change-over of the recording medium;
- a random access memory for forming a working area in which various data are mutually transmitted and received between said random access memory;
- a central processing unit controlling respective parts of said facsimile device;
- an image memory having a capacity capable of memorizing the image data transmitted from outside during at least the time period needed for changing over said recording medium, said image memory accumulating the image data sent out from the transmission side of said facsimile device at the time of changing over said recording medium;
- a data compression and reproduction unit for reducing the amount of said image data produced by said scanner unit without loosing an original information and reproducing said image data in an original state in order to record said image data on said recording medium;
- a modulation/demodulation unit for receiving said image data reduced by said data compression and reproduction unit and modulating said reduced data therein, and demodulating and sending out image data to said data compression and reproduction unit; and
- a network control unit for receiving said image data modulated by said modulation/demodulation unit and performing a control of said network so as to send out said modulated image data onto said network, and for receiving image data transmitted through said network and storing said image data in said image memory.

5. A facsimile device as defined in claim 4, in which only one page volume of said image data is received by said fascimile device and said first set of recording medium is changed over to the second set.

6. A facsimile device as defined in claim 4, in which a plural page volume of said image data is received by said facsimile device and said first set of recording medium is changed over to the second set.

7. A fascimile device as defined in claim 4, in which said first set of recording medium is changed over to the second set at a moment of transition between a page and another page.

8. A facsimile device as defined in claim 4, in which said central processing unit is used for controlling respective parts of said facsimile device such that external data are introduced into said random access memory in accordance with the program stored in said read only memory and transmitting or receiving the data between said central processing unit and the random access memory to thereby execute a sequence as the facsimile device and further practice the program thereof.

9. A facsimile device as defined in claim 4, in which said image memory is a memory of First-In-First-Out type for storing image data and reading out said image data in the order of storing said image data.

10. A facsimile device as defined in claim 3, in which a plurality of original manuscripts are set up on said original manuscript table.

11. A facsimile device as defined in claim 3, in which said scanner unit comprises an automatic document feed roller, a separation rubber, plural combinations of a pressure roller and a feed roller, and an image sensor disposed between said combination of rollers.

12. A facsimile device as defined in claim 11, in which said automatic document feed roller sends out said original manuscript set up on said original manuscript table to a gap between said pressure roller and said feed roller one by one by the cooperative action with said separation rubber.

13. A facsimile device as defined in claim 11, in which all of said respective pressure rollers and feed rollers rotate at a same revolutionary speed and contribute to convey said original manuscript sent out from said automatic document feed roller at a predetermined speed.

14. A facsimile device as defined in claim 11, in which said image sensor is a close-contact type line image sensor, said sensor reading out image information recorded on said original manuscript carried by said sets of rollers.

15. A facsimile device as defined in claim 3, in which said plotter unit comprises paper guides, pairs of transporting rollers, a cutter unit for cutting said recording medium, said cutter unit being disposed between said pairs of transporting rollers, a pair of resist rollers, a thermal head, a platen roller and a discharging roller.

16. A facsimile device as defined in claim 15, in which said thermal head comprises a plurality of heat-emitting elements arranged in a direction of an axis of said platen roller so as to oppose thereto.

17. A facsimile device as defined in claim 15, in which driving of said paris of transporting rollers and said resist roller is controlled by said control means, and whether said first set of recording medium or said second set of recording medium is supplied to said plotter unit is determined in accordance with whether said one pair of transporting rollers or said another pair of transporting rollers functions.

18. A facsimile device as defined in claim 15, in which said cutter unit is controlled by said control means, and thereby said cutter cuts said heat-sensitive recording medium so as to get a predetermined size when recording thereon is finished.

19. A facsimile device as defined in claim 15, in which changing-over of said heat-sensitive recording medium to the other is done by winding back either one of said pairs of transporting rollers in a rotating direction opposite to that of transporting said rollers and taking out said recording medium being employed, and thereafter said heat-sensitive recording medium to be newly employed is set by driving said pairs of transporting rollers.

* * * * *